United States Patent
Fodor et al.

(10) Patent No.: US 9,260,166 B1
(45) Date of Patent: Feb. 16, 2016

(54) MULTIPLE POSITION HIDDEN AFT LOUNGE SEAT

(71) Applicants: Carrie A. Fodor, Cape Canaveral, FL (US); Jacob Weaver, Melbourne, FL (US); Paul Bramel, Palm Bay, FL (US)

(72) Inventors: Carrie A. Fodor, Cape Canaveral, FL (US); Jacob Weaver, Melbourne, FL (US); Paul Bramel, Palm Bay, FL (US)

(73) Assignee: Brunswick Corporation, Lake Forest, IL (US)

( * ) Notice: Subject to any disclaimer, the term of this patent is extended or adjusted under 35 U.S.C. 154(b) by 49 days.

(21) Appl. No.: 14/176,559

(22) Filed: Feb. 10, 2014

(51) Int. Cl.
  *B63B 29/04* (2006.01)
  *B60N 2/20* (2006.01)

(52) U.S. Cl.
  CPC .. *B63B 29/04* (2013.01); *B60N 2/20* (2013.01)

(58) Field of Classification Search
  CPC .................................. B60N 2/206; B60N 2/63
  USPC ............... 297/378.12, 215.12, 184.11, 378.1, 297/423.2, 423.28, 423.3; 114/363, 61.24
  See application file for complete search history.

(56) References Cited

U.S. PATENT DOCUMENTS

| | | | | |
|---|---|---|---|---|
| 155,524 | A * | 9/1874 | Lambert | 297/423.2 |
| 327,775 | A * | 10/1885 | Dodge | 297/320 |
| 556,343 | A * | 3/1896 | Fleer et al. | 297/319 |
| 1,919,110 | A * | 7/1933 | Horvath | 297/29 |
| 1,984,281 | A * | 12/1934 | Poggendorf | 297/317 |
| 2,150,478 | A * | 3/1939 | Yerrick | 297/320 |
| 2,502,061 | A * | 3/1950 | Radford | B60N 2/3013 296/156 |
| 2,837,140 | A * | 6/1958 | Hedman | 297/22 |
| 3,016,265 | A * | 1/1962 | Cobb | 297/88 |
| 3,202,453 | A | 8/1965 | Richards | |
| 3,473,176 | A | 10/1969 | Taylor | |
| 4,131,312 | A * | 12/1978 | Price | 297/184.11 |
| 4,167,288 | A * | 9/1979 | Kiang | 297/378.1 |
| 4,230,363 | A * | 10/1980 | Borichevsky | 297/184.15 |
| 4,919,068 | A | 4/1990 | Lathers | |
| 5,096,257 | A * | 3/1992 | Clark | 297/184.15 |
| 5,136,963 | A | 8/1992 | Zuzik | |
| 5,967,601 | A * | 10/1999 | Gillins | 297/184.15 |
| 6,230,648 | B1 | 5/2001 | Davidson et al. | |
| 6,283,059 | B1 | 9/2001 | Scully, Jr. | |
| 6,663,176 | B1 * | 12/2003 | Tull | 297/182 |
| 6,945,190 | B1 | 9/2005 | Frandsen | |
| 6,979,056 | B1 * | 12/2005 | Goldszer | 297/184.15 |
| 7,302,906 | B2 * | 12/2007 | Burroughs et al. | 114/363 |
| 7,341,018 | B2 | 3/2008 | Greenberg et al. | |
| 8,287,038 | B2 * | 10/2012 | Henderson | 297/184.17 |

(Continued)

FOREIGN PATENT DOCUMENTS

EP 229612 A2 * 7/1987 ............... B60N 1/00

*Primary Examiner* — David R Dunn
*Assistant Examiner* — Timothy J Brindley
(74) *Attorney, Agent, or Firm* — Malin Haley DiMaggio & Bowen, P.A.

(57) ABSTRACT

A seat for a marine vessel capable of multiple positions while maintaining a hidden or concealed look when closed. The seat has a seat back hingeably attached to a seat bottom and a seat back cap hingeably attached to a leading edge of the seat back. The seat is operable between a plurality of selected positions including an open position and a closed position. In the open position, the seat back is upright and the seat provides at least one traditional seating surface. In the closed position, the seat back rests substantially parallel on the seat bottom and a rear surface of the seat back functions as a sun pad. In the closed position, the seat back cap is deployed over a leading edge of the seat bottom and the leading edge of the seat back to conceal the seat. A positionable leg extension pad extends from the seat bottom.

14 Claims, 3 Drawing Sheets

(56) References Cited

U.S. PATENT DOCUMENTS

| | | | |
|---|---|---|---|
| 8,794,706 B2* | 8/2014 | Lin | 297/423.28 |
| 8,864,221 B1* | 10/2014 | Delvilla | 297/31 |
| 8,899,169 B1* | 12/2014 | Jaziri | B63B 17/00 |
| | | | 114/363 |
| 2005/0236882 A1* | 10/2005 | Kim | 297/378.1 |
| 2007/0040422 A1* | 2/2007 | Reeb et al. | 297/184.1 |
| 2008/0196649 A1* | 8/2008 | Kalil | B63B 29/04 |
| | | | 114/201 R |
| 2008/0284217 A1* | 11/2008 | Noonan | 297/184.11 |
| 2010/0037814 A1* | 2/2010 | Sahr | B63B 29/02 |
| | | | 114/363 |
| 2010/0319604 A1* | 12/2010 | Mayrand | B63B 29/02 |
| | | | 114/363 |
| 2011/0298249 A1* | 12/2011 | Kuno | 297/75 |
| 2013/0127213 A1* | 5/2013 | Combs | 297/184.11 |
| 2013/0292987 A1* | 11/2013 | Doucette et al. | 297/423.3 |

\* cited by examiner

MULTIPLE POSITION HIDDEN AFT LOUNGE SEAT

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to marine vessels and watercraft and more particularly to a multiple position hidden aft lounge seat for marine vessels and watercraft.

2. Description of Related Art

Marine vessel and watercraft designs have included a variety of seating arrangements and designs for the boaters. The specific seating arrangements conventially reflect the overall size and intended use of the boat, whether it be pleasure-craft, sport-fishing, water sports, etc. . . . . Many pleasure-craft incorporate various forms of sunpads that are used by boaters to sunbathe. Such sunpads are often located across areas of the boat and do not provide actual seating, but rather provide a simply flat surface. It is typical to find such sunpads over an engine compartment at an elevation significantly higher than the deck of the boat. However, given the limited amount of space found on typical marine vessels, there are benefits to providing multiple-purpose seating features that improve on existing sunpad and seating arrangements. Accordingly, there is a need in the art for improved and more robust seating configurations and, in particularly, convertible or multi-position seating configurations.

Although prior designs have sought to improve the structure, operation, and utility of seats on marine vehicles, these designs have failed to adequately maximize space and allow for a variety of seated, lounging, and sunbathing positions. For example, U.S. Pat. No. 7,341,018 to Greenberg discloses a rumble seat that is pivotally and retractably mounted within the fore deck of a boat. A seat is frame mounted, and the assembly pivots from a closed position with a back forming deck panel, and an upright seating position similar to early automotive designs. This design does not provide as sundeck, only seating. The U.S. Pat. No. 6,230,648 to Davidson teaches particular seat and platform assemblies which are collapsible for desired configurations and uses specific to bass boats that do not provide a wide variety of available positions or a robust set of features pertinent to pleasure-craft. U.S. Pat. No. 5,136,963 to Zuzik relates to an aft deployable sun pad/deck section but doesn't provide enhanced usable space or efficient multiple seating positions.

While these designs provide some modularity as to seating positions, they are not engineered to be useful for aft seating near the transom of a vessel, nor do they provide adequate modularity and the multiple-positions desired and needed in the marine vessel designs of today. Accordingly, there is a need in the art for a better designed, more modular seating system for marine vessels that provides optimum comfort and a variety of usable seating and lounging positions while maintaining simple operation and a unified appearance.

It is, therefore, to the effective resolution of the aforementioned problems and shortcomings of the prior art that the present invention is directed. However, in view of the marine vessel seating systems in existence at the time of the present invention, it was not obvious to those persons of ordinary skill in the pertinent art as to how the identified needs could be fulfilled in an advantageous manner.

SUMMARY OF THE INVENTION

The present invention provides various embodiments of a seat for a vessel capable of multiple positions while maintaining a hidden or concealed look when closed. In some embodiments, the seat has a seat back hingeably attached to a seat bottom and a seat back cap hingeably attached to a leading edge of the seat back. The seat is operable between a plurality of selected positions including an open position and a closed position. In the open position, the seat back is upright and the seat provides at least one traditional seating surface. In the closed position, the seat back rests substantially parallel on the seat bottom and a rear surface of the seat back functions as a sun pad. In some embodiments, in the closed position, the seat back cap is deployed over a leading edge of the seat bottom and the leading edge of the seat back to conceal the seat.

Also included is a leg extension pad hingeably attached to the leading edge of the seat bottom and deployable by one or more pull tabs attached to the seat bottom. In some embodiments, the seat is supported by a seat frame having a recess beneath the seat bottom and a leg extension support platform extending from the recess. The leg extension pad is at least partially supported by the leg extension support platform when deployed. When the leg extension is not deployed, the leg extension pad is folded under the seat bottom and is received in the recess therebelow.

The seat is also operable to an angled position wherein the leg extension pad and the seat bottom form a substantially V-shaped configuration to accommodate the lower extremities of a user. One or more deployable struts are hingeably attached to the seat bottom to provide support between the seat bottom and the recess below the seat bottom when the seat is in the angled position.

Accordingly, it is an object of the present invention to provide a convertible lounger seat that is operable between a sun pad and multi-positional aft-fact lounger seat.

It is another object of the present invention to accomplish the multiple seating configurations with a simple design and limited hinge points.

It is another object of the present invention to provide a simple to operate and sturdy convertible lounger for use on watercraft.

It is another object of the present invention to provide a seat that is concealable to provide optimum aesthetics and usable space.

In accordance with these and other objects which will become apparent hereinafter, the instant invention will now be described with particular reference to the accompanying drawings.

DETAILED DESCRIPTION

Figure 1:
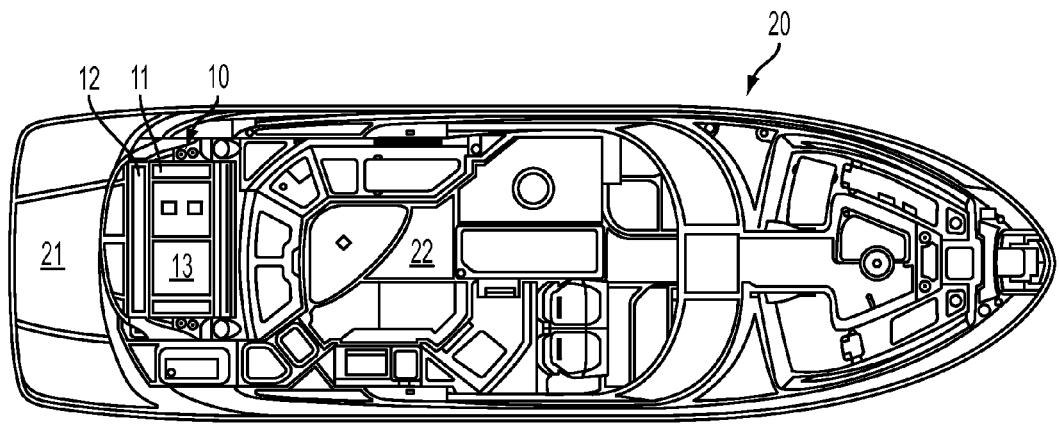
FIG. 1 is a top view of one embodiment of the seat of the present invention in a flat, sunpad configuration.
Figure 2:
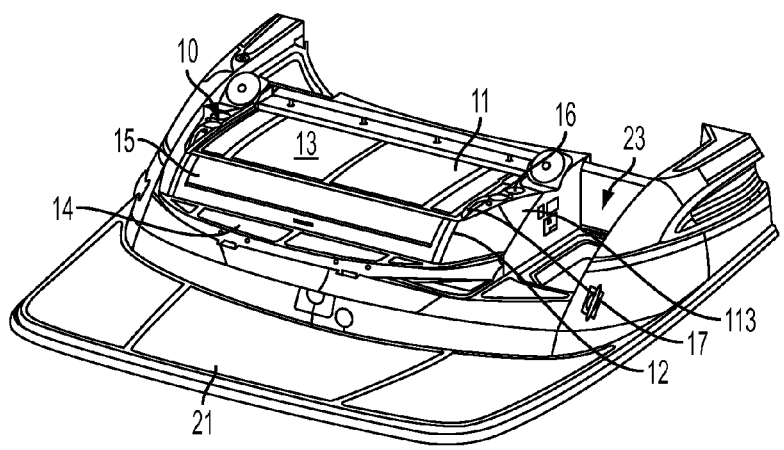
FIG. 2 is a rear perspective view of one embodiment of the seat of the present invention in a flat, sunpad configuration.

With reference to FIG. 1, shown is a top view of the seat 10 of the present invention installed in a boat 20, configured as a fiberglass hulled pleasure craft. Seat 10 is disposed toward the aft of the vessel but forward of the transom 21. In some embodiments, the seat 10 is contained within a seat frame 113 that is integral with the boat 20 and forms the surrounding structural support for the seat 10. Seat 10 generally comprises a seat back 11 hingeably attached to a seat bottom 12. The seat back 11 includes a rear surface 13 that functions as a sun pad or lounging deck when the seat back 11 is in a closed position relative to the seat bottom 12. In the closed position, seat bottom 11 rests on seat bottom 12 and rear surface 13 is substantially parallel to the seat bottom 12 and the deck 22 of the boat 20 when in the closed position. FIG. 2 shows a rear perspective view of the vessel 20 having seat 10 in a closed position. Here, seat 10 is slightly offset from the center axis of the vessel 20 and is adjacent to a transom access hatch 23 although this location is not limiting as the seat 10 can be installed anywhere that is practicable given the configuration of the boat 20. Also shown is the at least partially concealed leg extension platform 14 that extends from the seat bottom 12. Additionally, a seat back cap 15 is hingeably attached to the top edge of the seat back 11. When the seat back 11 is in a closed position, the seat back cap 15 conceals and covers the rear or visible leading edge of the seat 10 and in particularly the seat bottom 12 and related features. Thus, the seat back cap 15 provides a sleek and uniform look for the boat 20 when the seat 10 is closed. On either side of the seat 10 and built in to the seat frame 113 adjacent to the seat bottom 12 are convenience features including one or more cup holders 16 and a grab handle 17.

Figure 3:
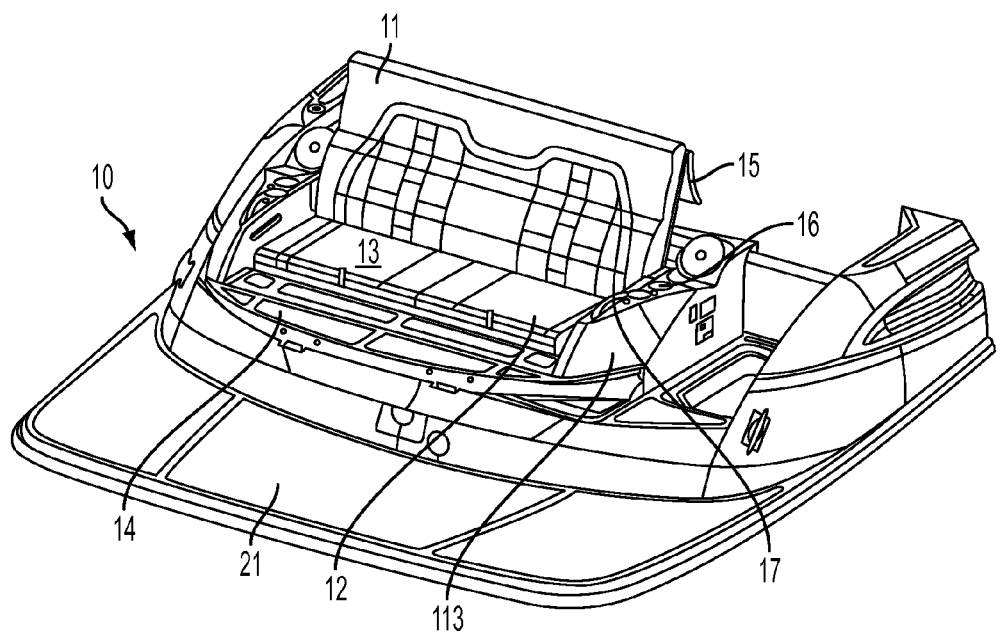
FIG. 3 is a rear perspective view of one embodiment of the seat of the present invention in an aft-facing seat configuration.
Figure 4:
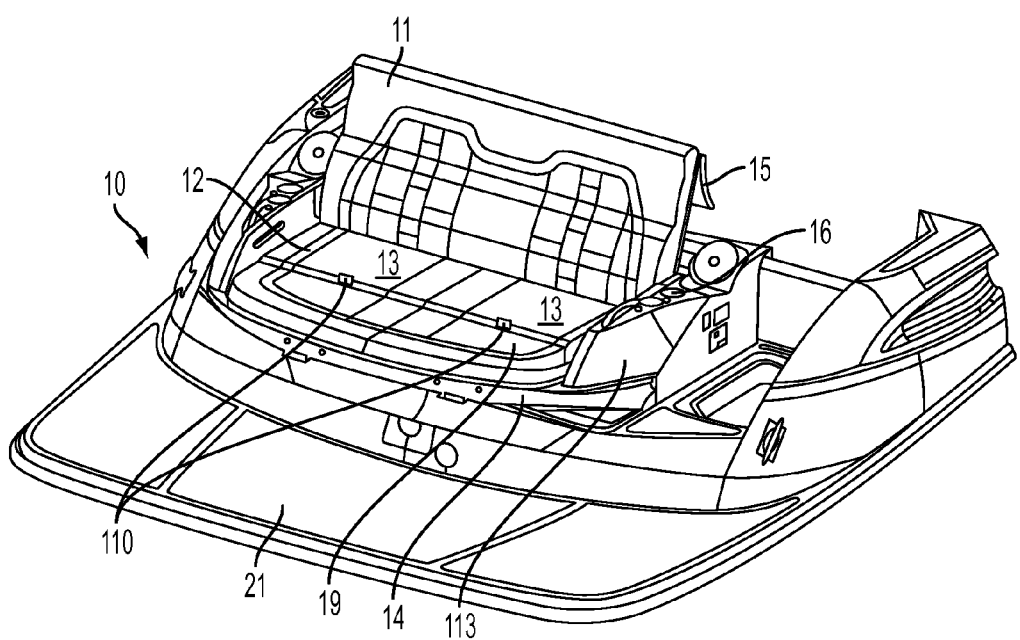
FIG. 4 is another rear perspective view of one embodiment of the seat of the present invention in an aft-facing seat configuration with a deployed leg extension.

FIGS. 3-4 shown is the seat 10 of the present invention in an opened position thereby providing aft-facing seating for one or more boaters. As shown in FIG. 3, in the open position seat back 11 is hinged and is placed in an upright position to expose at least one seating surface 18. Seat back cap 15 is hinged backward upon the seat back 11 and rests behind the seat back 11. Here, in some embodiments, seating surface 18 is divided in two, providing a starboard seat and a port seat to accommodate at least two boaters. Shown also is leg extension platform 14 that extends in front of the seat bottom 12 and is integral with the deck of the boat. Shown in FIG. 4 is the seat 10 in an open position with an additional leg extension pad 19 shown in a deployed position. The leg extension pad 19 is hingeably attached to the seat bottom 12 and is deployable by way of one or more pull tabs 110 attached at the leading edge of the seat bottom 12. The user pulls upward on the pull tabs 110 which causes the leg extension pad 19 to fold outward and downward toward leg extension platform 14. Once fully deployed, the leg extension pad 19 rests substantially flush with the leg extension platform 14 to provide support and padding for a boaters legs while sitting on the seat 10.

Figure 5:
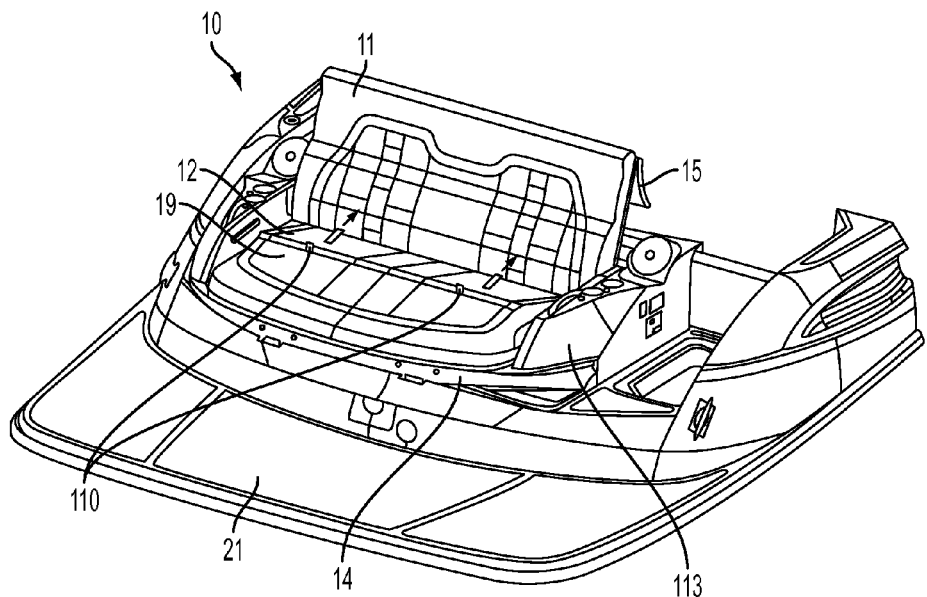
FIG. 5 is another rear perspective view of one embodiment of the seat of the present invention in an aft-facing seat configuration with a retracting leg extension.
Figure 6:
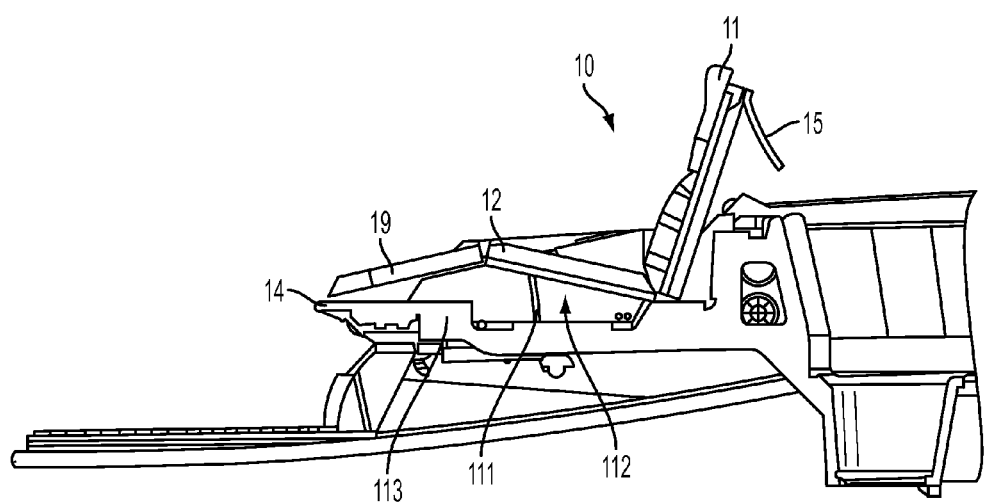
FIG. 6 is a side view of one embodiment of the seat of the present invention with the leg extension being retracted.

FIGS. 5-6 depict yet another position that the seat 10 of the present invention is capable of. Here, the seat bottom 12 can be angled upward and the leg extension pad 15 can be angled downward creating a V-shaped contour suitable for accommodating the lower extremity anatomy of typical boater. This position is created when the use pulls upward on pull tabs 110 and deploys one or more struts 111 that are hingeably attached to the bottom of the seat bottom 12. The struts 111 are supporting members attached at one end to the bottom of seat bottom 12 and either rest against or are attached to the seat recess 112 below seat bottom 12. As shown here, the seat recess 112 is integral with the structure of the boat and forms a portion of the seat frame 113 that supports the entire seat 10 structure. The leg extension platform 14 extends aft of the seat recess 112 and is generally at an elevation above the seat recess 112 in order to provide support for the leg extension pad 15 when deployed. When the leg extension pad 15 is not deployed, such as is shown in FIG. 3, it is folded underneath seat bottom 12 and is contained within recess 112.

As is shown and described, the seat 10 of the present invention is capable of at least four different positions, a sunpad configuration, an aft-facing seat, an aft-facing seat with leg extensions, and an aft-facing seat with angled leg extensions. These positions provide the primary and most desirable seating positions for a boater at the rear of the vessel. Additionally, because the seat 10 is configured to be concealed by way of folding seat back 11 down and deploying the seat back cap 15, the seat 10 provides optimum convenience without detracting from the overall design aesthetic of the boat 20 on which it is installed.

It is appreciated that the present seat 10 can comprise a variety of materials commonly used in construction of marine vessels and water craft including fiberglass, resins, plastics, vinyls, foams, and combinations thereof. Furthermore it is appreciated that the seat 10 can be installed in any desired location on a marine vessel or watercraft including on the deck, in the cockpit, at the front of the vessel or elsewhere. It is appreciated that the seat of the present invention is not limited for use in connection with marine vessels and watercraft although the system is particularly well suited for such applications. Finally, it is understood that the size, shape and overall dimensions of the seat 10 is not limited to those dimensions inferred from the drawings herein. The invention is designed to be scalable for a variety of applications without departing from the novel structure and function described herein.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A seat for a marine vessel, comprising:
  a seat back hingeably attached to a seat bottom, said seat back and seat bottom contained within a seat frame, said seat frame integral with said marine vessel;
  a seat back cap hingeably attached to a leading edge of said seat back;
  wherein said seat is operable between a plurality of selected positions including an open position and a closed position;
  wherein in said open position, said seat back is upright relative to said seat bottom providing at least one seating surface;
  wherein, in said closed position, said seat back rests substantially parallel on said seat bottom and a rear surface of said seat back functions as a sun pad; and
  wherein, in said closed position, said seat back cap is deployed over a leading edge of said seat bottom and said leading edge of said seat back to conceal said seat.

2. The seat of claim 1, further comprising a leg extension pad hingeably attached to said leading edge of said seat bottom and deployable by one or more pull tabs attached to said seat bottom.

3. The seat of claim 2, wherein said seat is supported by said seat frame, said seat frame including a recess beneath said seat bottom and a leg extension support platform extending from said recess, said leg extension pad at least partially supported by said leg extension support platform when deployed.

4. The seat of claim 3, wherein said leg extension pad is folded under said seat bottom and is received in said recess when said leg extension pad is not deployed.

5. The seat of claim 3, wherein said seat frame includes at least one cup holder and at least one grab bar adjacent to said seat bottom.

6. The seat of claim 3, wherein said seat is operable to an angled position wherein said leg extension pad and said seat bottom form a substantially V-shaped configuration to accommodate the lower extremities of a user.

7. The seat of claim 6, wherein one or more deployable struts hingeably attached to said seat bottom provide support between said seat bottom and said recess when said seat is in said angled position.

8. A hidden aft lounge seat for a marine vessel, comprising:
a seat back hingeably attached to a seat bottom;
a seat back cap hingeably attached to a leading edge of said seat back;
wherein said seat is operable between a plurality of selected positions including an open position and a closed position;
wherein in said open position, said seat back is upright relative to said seat bottom providing at least one seating surface;
wherein, in said closed position, said seat back rests substantially parallel on said seat bottom and a rear surface of said seat back functions as a sun pad;
wherein, in said closed position, said seat back cap is deployed over a leading edge of said seat bottom and said leading edge of said seat back to conceal said seat; and
wherein said seat is disposed within a seat frame, said seat frame integral with said marine vessel and adjacent to a transom of said marine vessel.

9. The seat of claim 8, further comprising a leg extension pad hingeably attached to said leading edge of said seat bottom and deployable by one or more pull tabs attached to said seat bottom.

10. The seat of claim 9, wherein said seat is supported by said seat frame, said seat frame including a recess beneath said seat bottom and a leg extension support platform extending from said recess, said leg extension pad at least partially supported by said leg extension support platform when deployed.

11. The seat of claim 10, wherein said leg extension pad is folded under said seat bottom and is received in said recess when said leg extension pad is not deployed.

12. The seat of claim 10, wherein said seat frame includes at least one cup holder and at least one grab bar adjacent to said seat bottom.

13. The seat of claim 10, wherein said seat is operable to an angled position wherein said leg extension pad and said seat bottom form a substantially V-shaped configuration to accommodate the lower extremities of a user.

14. The seat of claim 10, wherein one or more deployable struts hingeably attached to said seat bottom provide support between said seat bottom and said recess when said seat is in said angled position.

* * * * *